US010009801B1

(12) United States Patent
Holtzman et al.

(10) Patent No.: US 10,009,801 B1
(45) Date of Patent: Jun. 26, 2018

(54) SYSTEMS AND METHODS FOR FORMING AN INCIDENT AREA NETWORK

(71) Applicant: MOTOROLA SOLUTIONS, INC., Chicago, IL (US)

(72) Inventors: Guy Holtzman, Tel Aviv (IL); Kiril Danilchenko, Beer Sheva (IL); Baruh Hason, Tel Aviv-Yaffo (IL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 2 days.

(21) Appl. No.: 15/369,494

(22) Filed: Dec. 5, 2016

(51) Int. Cl.
   *H04W 36/00*  (2009.01)
   *H04L 29/12*  (2006.01)
   *H04W 76/02*  (2009.01)
   *H04W 56/00*  (2009.01)
   *G06F 17/30*  (2006.01)
   *H04W 76/10*  (2018.01)

(52) U.S. Cl.
   CPC .. *H04W 36/0027* (2013.01); *G06F 17/30575* (2013.01); *H04L 61/1511* (2013.01); *H04L 61/2007* (2013.01); *H04L 61/25* (2013.01); *H04W 56/001* (2013.01); *H04W 76/02* (2013.01); *H04W 76/10* (2018.02)

(58) Field of Classification Search
   CPC ................................................ H04W 36/0027
   See application file for complete search history.

(56) References Cited

U.S. PATENT DOCUMENTS 6,331,984 B1  12/2001  Luciani
7,464,151 B1  12/2008  Drennen et al.
8,041,335 B2 *  10/2011  Khetawat .............. H04W 12/08
                                                  455/404.1
8,964,761 B2  2/2015  Shin et al.
9,407,599 B2  8/2016  Koponen et al.
(Continued)

FOREIGN PATENT DOCUMENTS

WO          00/14633          3/2000

OTHER PUBLICATIONS

GB1718463.1 Search Report from the United Kingdom Intellectual Property Office dated Apr. 26, 2018 (1 page).

*Primary Examiner* — Jason E Mattis
(74) *Attorney, Agent, or Firm* — Michael Best & Friedrich LLP (57) ABSTRACT

A system and method for forming an incident area network including a first sub-system and a second sub-system. The method includes detecting, with an electronic processor of the first sub-system, a network connection to the second sub-system. The method includes initiating a sub-system synchronization process. The process includes including transmitting, from a first domain name server of the first sub-system to a second domain name server of the second sub-system, a first global network address for a first global application instance of the first sub-system, and a first name corresponding to the first global network address. The process includes transmitting, from a first network address translator of the first sub-system to a second network address translator of the second sub-system, the first global network address. The process includes synchronizing a first localized application instance of the first sub-system, with a second localized application instance of the second sub-system.

20 Claims, 9 Drawing Sheets

(56) References Cited

U.S. PATENT DOCUMENTS

| | | | |
|---|---|---|---|
| 2007/0050507 A1* | 3/2007 | Ollikainen | H04L 29/12066 |
| | | | 709/227 |
| 2010/0272063 A1* | 10/2010 | Kato | H04W 8/082 |
| | | | 370/331 |
| 2013/0034099 A1* | 2/2013 | Hikichi | H04L 61/2532 |
| | | | 370/392 |
| 2013/0229270 A1* | 9/2013 | Srinivasan | H04W 36/18 |
| | | | 340/328 |
| 2014/0301191 A1* | 10/2014 | Ludwig | H04L 45/72 |
| | | | 370/230 |
| 2014/0358812 A1* | 12/2014 | Hourte | H04W 4/22 |
| | | | 705/325 |
| 2015/0215406 A1 | 7/2015 | Eggert et al. | |

* cited by examiner

SYSTEMS AND METHODS FOR FORMING AN INCIDENT AREA NETWORK

BACKGROUND OF THE INVENTION

Public safety agencies responding to an incident (for example a building fire, a criminal pursuit or other law enforcement activity, a natural disaster, a medical incident, a traffic accident, and the like) may coordinate response efforts using wireless communications devices. The wireless communications devices communicate data, video, voice, and other traffic through one or more network sub-systems (for example, a Long Term Evolution (LTE) wireless network) providing communications coverage at or near the area of the incident. Two or more network sub-systems may be connected to form an incident area network. In an incident area network, wireless communications devices may handover between the sub-systems (that is, transfer from one network sub-system to another) as the devices move around the incident area. Each network sub-system in an incident area network includes applications for providing services to the wireless communications devices. Some types of applications may have an instance in each sub-system making up an incident area network, while other types of applications may have an instance in only one sub-system within the incident area network.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Network sub-systems used by public safety agencies responding to an incident include application instances. Application instances reside on one or more application servers in a sub-system, and provide services to portable communications devices associated with (that is, registered with and communicating through) that sub-system. Some types of application instances are localized (that is, each sub-system contains an application instance of that type). Localized application instances in a sub-system enable access to the services by portable communications devices attached to the sub-system, regardless of whether the sub-system is part of an incident area network. Other application instances are global (that is, there is only one such application in one sub-system). A global application instance may be accessed by portable communications devices associated with the sub-system containing the global application instance. A global application instance may also be accessed by portable communications devices associated with another sub-system that is part of in an incident area network including the sub-system containing the global application instance.

Sub-systems in an incident area network may handover, or transfer, portable communications devices between one another. When a handover occurs, communications to some application instances may be interrupted. For example, a portable communications device transferred to a new sub-system may not know the local network address of one or more localized application instances on its new sub-system. In another example, the new sub-system may not know how to enable communication between the portable communications device and one or more global application instances located outside itself. Accordingly, systems and methods are provided herein for forming an incident area network between sub-systems to, among other things, improve session continuity between portable communications devices and localized and global application instances.

One exemplary embodiment provides a system for forming an incident area network. The system includes a first sub-system in communication with a first portable communications device. The first sub-system includes a network core including an electronic processor, a first domain name server, a first global application instance, a first localized application instance, and a first network address translator. The second sub-system includes a second domain name server, a second global application instance, a second localized application instance, and a second network address translator. The electronic processor is configured to detect a network connection to the second sub-system and initiate a sub-system synchronization process. The first domain name server is configured to, in response to the initiation of the sub-system synchronization process, transmit to the second domain name server a first global network address for the first global application instance, and a first name corresponding to the first global network address. The first network address translator is configured to transmit to the second network address translator the first global network address. The first localized application instance is configured to synchronize with the second localized application instance.

Another exemplary embodiment provides a method for forming an incident area network including a first sub-system and a second sub-system. The method includes detecting, with an electronic processor of the first sub-system, a network connection to the second sub-system. The method includes initiating a sub-system synchronization process. The process includes including transmitting, from a first domain name server of the first sub-system to a second domain name server of the second sub-system, a first global network address for a first global application instance of the first sub-system, and a first name corresponding to the first global network address. The process includes transmitting, from a first network address translator of the first sub-system to a second network address translator of the second sub-system, the first global network address. The process includes synchronizing a first localized application instance of the first sub-system, with a second localized application instance of the second sub-system.

For ease of description, some or all of the exemplary systems presented herein are illustrated with a single exemplar of each of its component parts. Some examples may not describe or illustrate all components of the systems. Other exemplary embodiments may include more or fewer of each of the illustrated components, may combine some components, or may include additional or alternative components.

Figure 1:
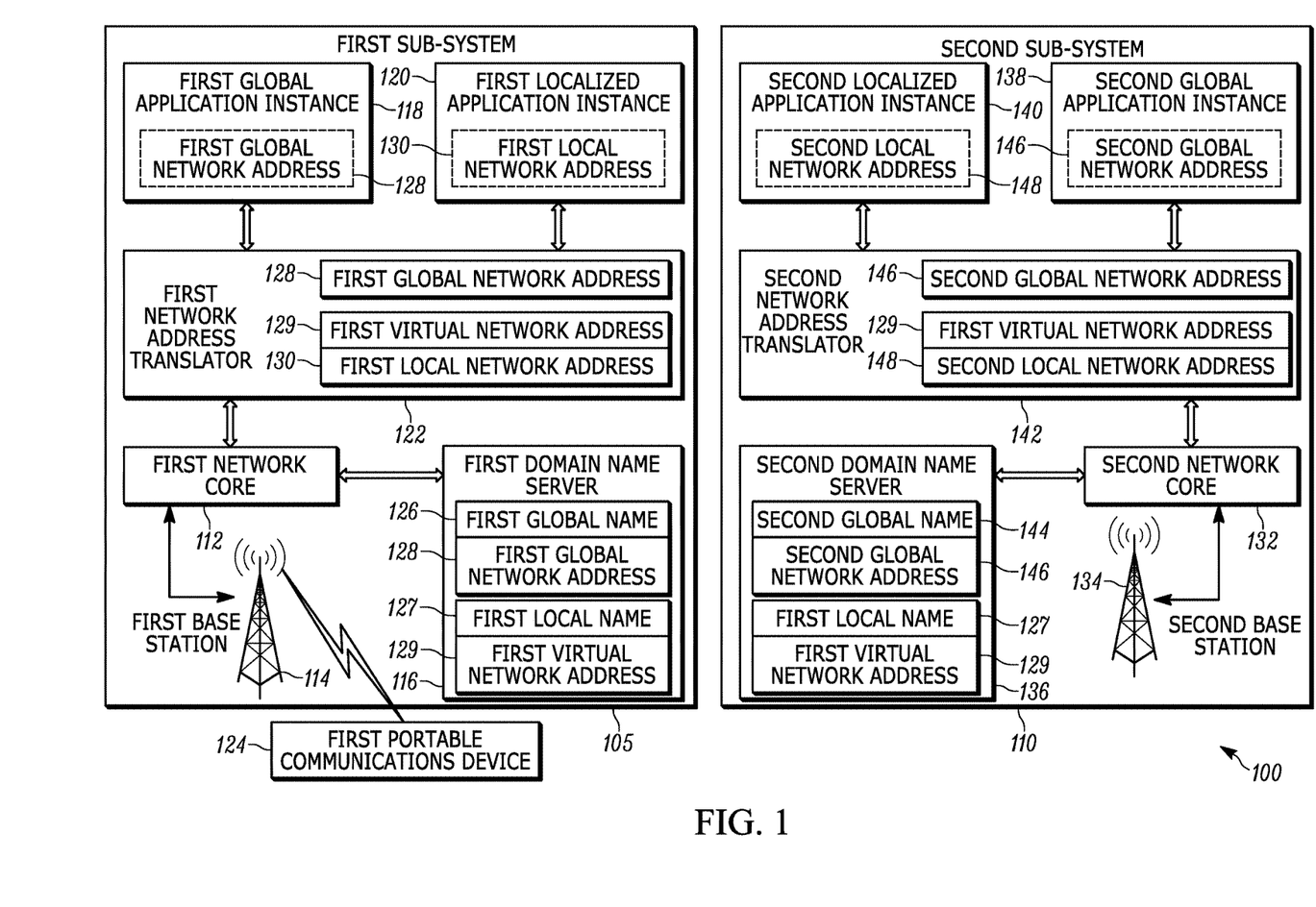
FIG. 1 is a block diagram of a system for forming an incident area network in accordance with some embodiments.

FIG. 1 is a block diagram of a system 100 for forming an incident area network. The system 100 includes a first sub-system 105 and a second sub-system 110. In some embodiments, the first sub-system 105 and the second sub-system 110 may be, for example, Long Term Evolution (LTE) networks. However, the concepts and techniques embodied and described herein may be implemented with networks using other protocols, for example, Global System for Mobile Communications (or Groupe Special Mobile (GSM)) networks, Code Division Multiple Access (CDMA) networks, Evolution-Data Optimized (EV-DO) networks, Enhanced Data Rates for GSM Evolution (EDGE) networks, 3G networks, 4G networks, and other suitable wireless networks, including future-developed network architectures. In some embodiments, the first sub-system 105 and the second sub-system 110 operate using the internet protocol (IP). In other embodiments, they operate using a suitable network protocol, including future-developed protocols.

The first sub-system 105 includes a first network core 112, a first base station 114, a first domain name server 116, a first global application instance 118, a first localized application instance 120, and a first network address translator 122. The components of the first sub-system 105, as well as the other various modules and components (not shown) are coupled directly, by one or more control or data buses or wireless communications links, or a combination thereof.

One or more of the first network core 112, the first domain name server 116, the first global application instance 118, the first localized application instance 120, and the first network address translator 122 may be implemented on one or more electronic devices (for example, including an electronic processor, memory, and network interface). An exemplary first network address translator 122 is described more particularly below with respect to FIG. 2.

In one embodiment, the first network core 112 is an Evolved Packet Core (EPC) that includes components for controlling the operation of and routing traffic within and without the first sub-system 105. The first network core 112 also includes components for authenticating and associating user equipment (for example, the first portable communications device 124) to the first sub-system 105. In some embodiments, the first network core 112 includes a mobility management entity, a serving gateway, a packet data node gateway, and network nodes (not shown).

The first base station 114 includes hardware and software components for communicating wirelessly with devices and networks outside of the first sub-system 105. For example, in some embodiments, the first network core 112 controls the first base station 114 to communicate with the first portable communications device 124. In some embodiments, the first base station 114 is an Evolved Node B (eNodeB).

The first domain name server 116 translates names into network addresses (for example, using the Domain Name Service (DNS)). As illustrated, the first domain name server 116 stores a first global name 126, which corresponds to a first global network address 128 for the first global application instance 118, and a first local name 127, which corresponds to a first virtual network address 129. In one example, the first portable communications device 124 supplies the first global name 126 to the first domain name server 116. The first domain name server 116, in response to receiving the first global name 126, provides the first global network address 128 to the first portable communications device 124. The first portable communications device 124 communicates with the first global application instance 118 by addressing communications to the first global network address 128.

The first global application instance 118 is a software application that provides one or more services (for example, video content streaming from a camera located at the incident). The first global application instance 118 is unique within the system 100. For example, a video content stream may be unique to the first global application instance 118 and available only from the first global application instance 118 within the system 100. The services are available to user equipment (for example, the first portable communications device 124) that is able to communicate or is associated with the first sub-system 105. The first global application instance 118 is identified on the first sub-system 105 or other connected network sub-systems by the first global network address 128 (for example, an internet protocol address). The first global network address 128 is designated such that it is unique among the first sub-system 105, the second sub-system 110, and other network sub-systems that the first sub-system 105 may communicate with.

The first localized application instance 120 provides one or more services (for example, messaging, audio communications, and database applications). The first localized application instance 120 is unique to the first sub-system 105. For example, the first localized application instance 120 may only provide its services to user equipment associated with the first sub-system 105. The first localized application instance 120 is identified on the first sub-system 105 by the first local network address 130 (for example, an internet protocol address). The first global network address 128 is designated such that it is unique on the first sub-system 105. However, user equipment accesses the first localized application instance 120 via the first virtual network address 129, which is identical on the first sub-system 105, the second sub-system 110, and other network sub-systems that the first sub-system 105 may communicate with. Similarly, each instance of a localized application is assigned its own virtual network address, which is identical across multiple sub-systems. A portable communications device transferring between network sub-systems may thus access the same type of service (that is, a localized application instance) using the same network address, regardless of the sub-system to which the device is currently associated.

While the virtual network address of a type of localized application instance remains static across sub-systems, the local network addresses of the localized application instances may vary between sub-systems. Accordingly, embodiments provide the first network address translator 122, described more particularly below with respect to FIG. 2. As illustrated in FIG. 1, the first network address translator 122 stores (for example, in a memory) the first global network address 128 and the first virtual network address 129 mapped to the first local network address 130. As described more particularly below, the first network address translator 122 receives network traffic addressed to the first virtual network address 129, and re-addresses such network traffic to the first local network address 130. However, when the first network address translator 122 receives network traffic addressed to the first global network address 128, it passes such traffic through unchanged (that is, to the first global network address 128 without an address translation). In some embodiments, the first network address translator 122 may be implemented apart from other components of the first sub-system 105. In other embodiments, the first network address translator 122 may be part of a network node that directs network packets within and without the first sub-system 105 (for example, a gateway or router).

The second sub-system 110 includes a second network core 132, a second base station 134, a second domain name server 136, a second global application instance 138, a second localized application instance 140, and a second network address translator 142. For ease of description, the second sub-system 110 is similarly illustrated as the first sub-system 105. However, in some embodiments, the sub-systems have varied components, such as different combinations and types of localized or global application instances. The components of the second sub-system 110 are configured and operate similarly though potentially not identically to their counterparts in the first sub-system 105. The second global application instance 138 is identified on the second sub-system 110 or other connected network sub-systems by the second global network address 146. The second localized application instance 140 is identified on the second sub-system 110 by the second local network address 148. The second domain name server 136 stores a second global name 144, which corresponds to a second global network address 146 for the second global application instance 138. The second domain name server 136 also stores the first local name 127, which corresponds to the first virtual network address 129. The second network address translator 142 includes the second global network address 146 and the first virtual network address 129 mapped to the second local network address 148. The second network address translator 142 receives network traffic addressed to the first virtual network address 129, and re-addresses such network traffic to the second local network address 148. However, when the second network address translator 142 receives network traffic addressed to the second global network address 146, it passes such traffic through unchanged (that is, to the second global network address 146 without an address translation).

In some embodiments, the first portable communications device 124 is a smart telephone. In other embodiments, the first portable communications device 124 may be a portable radio, a tablet computer, or another portable or mobile electronic device containing software and hardware enabling it to communicate via the first sub-system 105, the second sub-system 110, or both.

Figure 2:
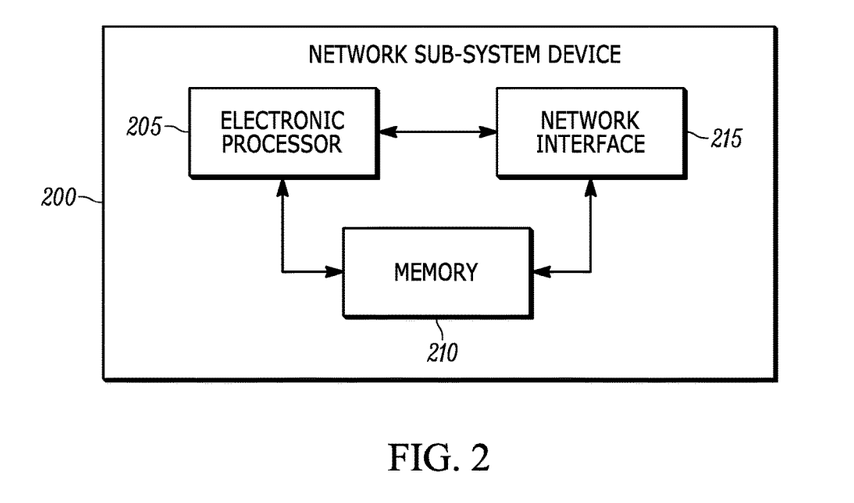
FIG. 2 is a block diagram of a network sub-system device in accordance with some embodiments.

FIG. 2 is a block diagram of one exemplary embodiment of a network subsystem device 200. In the embodiment illustrated, the network subsystem device 200 includes an electronic processor 205 (for example, a microprocessor, or other electronic controller), a memory 210, and a network interface 215. The electronic processor 205, the memory 210, and the network interface 215, as well as the other various modules are coupled directly, by one or more control or data buses, or a combination thereof.

The memory 210 may include read-only memory (ROM), random access memory (RAM), other non-transitory computer-readable media, or a combination thereof. In some embodiments, the memory 210 stores global network addresses and mappings between virtual and local network addresses, as described herein. The electronic processor 205 is configured to retrieve instructions and data from the memory 210 and execute, among other things, instructions to perform some or all of the methods described herein. As described more particularly below, in some embodiments, the electronic processor 205 routes or readdresses network packets based on the network addresses stored in the memory 210.

The electronic processor 205 controls the network interface 215 to send and receive data (for example, network packets) within or outside of the first sub-system 105, for example, to and from the second sub-system 110. For example, the network interface 215 may include a transceiver for wirelessly coupling to the first network core 112 and the other components of the first sub-system 105. Alternatively, or in addition, the network interface 215 may include a connector or port for receiving a wired connection (for example, Ethernet) to the components of the first sub-system 105.

The network subsystem device 200 is representative of the type of electronic device that may implement the components of the first sub-system 105 (or the second sub-system 110), including one or more elements of the network cores. For ease of description, only the first network address translator 122 is described herein.

Figure 3:
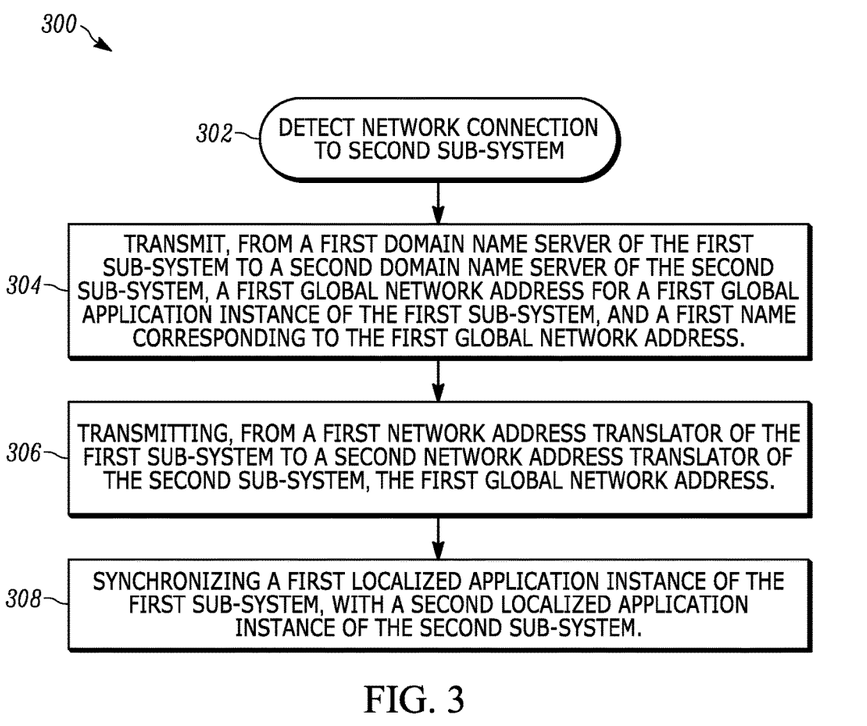
FIG. 3 is a flowchart of a method for forming an incident area network in accordance with some embodiments.
Figure 4:
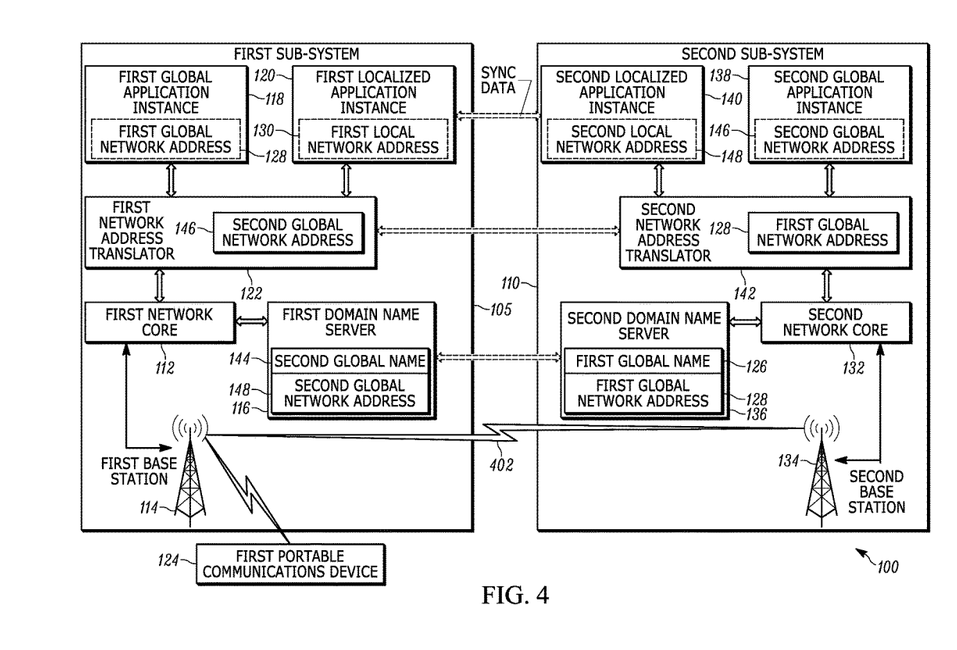
FIG. 4 is a block diagram of a system for forming an incident area network in accordance with some embodiments.

FIG. 3 is a flowchart of an exemplary method 300 for forming an incident area network including the first sub-system 105 and the second sub-system 110. As an example, the method 300 is explained in terms of at least an electronic processor of the first sub-system 105 (for example, in a component of the first network core 112) controlling (for example, by transmitting commands) components of the first sub-system 105. The method 300 is described with respect to FIG. 4, which is a block diagram of the system 100 prior to the formation of an incident area network. Other embodiments of the method 300 may be performed on multiple processors within the same device or on multiple devices.

At block 302, the electronic processor detects a network connection 402 (for example, an internet protocol layer connection) to the second sub-system 110 (see FIG. 4), and initiates a sub-system synchronization process. At block 304, in response to the initiation of the synchronization process, the first domain name server 116 transmits, to the second domain name server 136, the first global network address 128 and the first global name 126. At block 306, the first network address translator 122 transmits, to the second network address translator 142, the first global network address 128. At block 308 the first localized application instance 120 synchronizes with the second localized application instance 140. In one embodiment, the first localized application instance 120 and the second localized application instance 140 are database servers and the synchronization is a database synchronization (for example, replacing stale records in one database with fresh data from the other database, based on the timestamps of the records).

Figure 5:
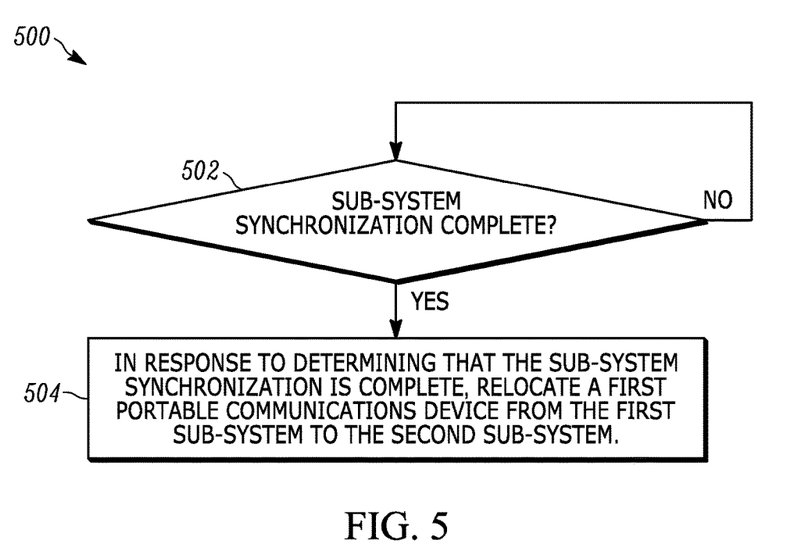
FIG. 5 is a flowchart of a method for forming an incident area network in accordance with some embodiments.
Figure 6:
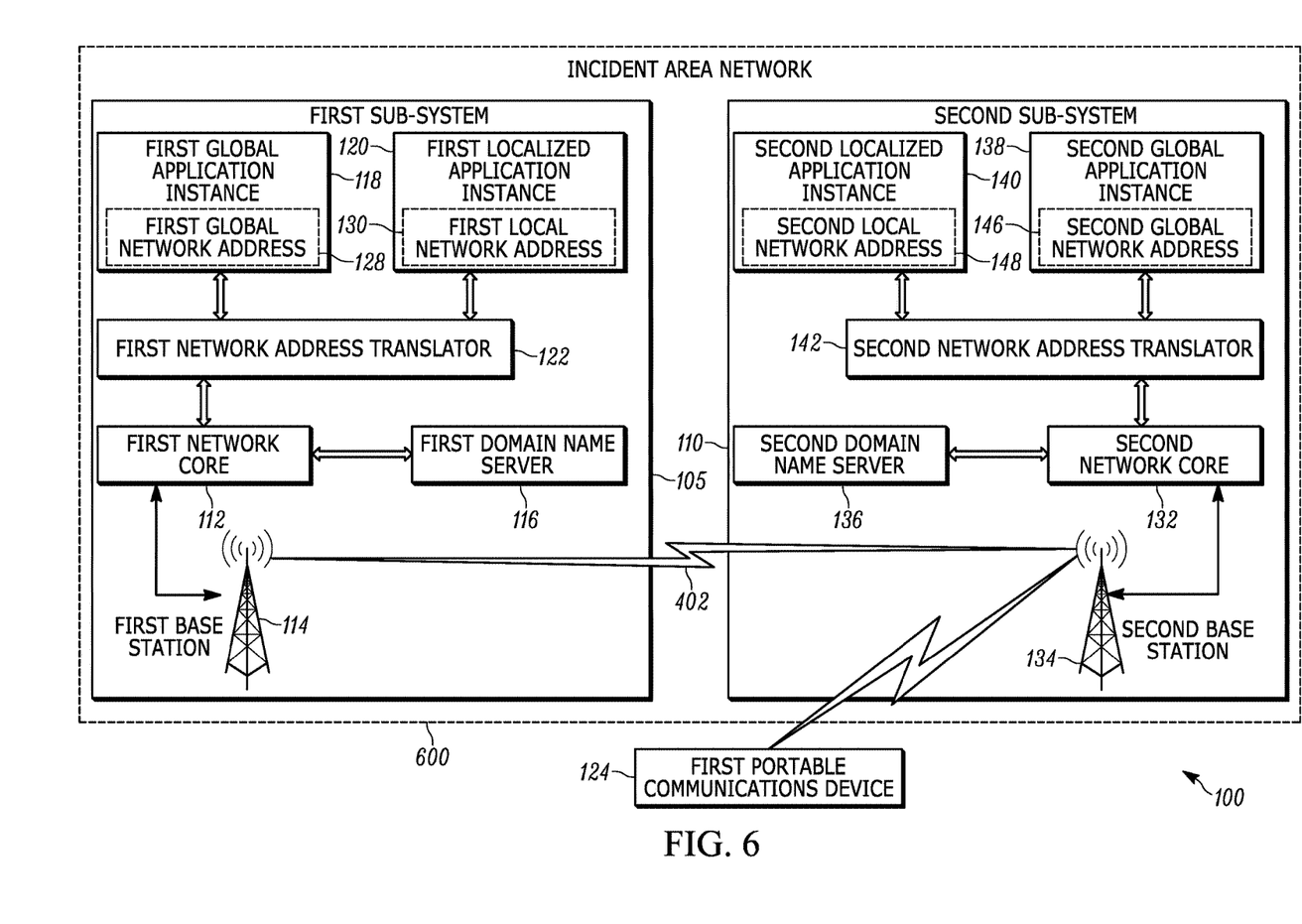
FIG. 6 is a block diagram of an incident area network in accordance with some embodiments.

As noted above, local network addresses differ between sub-systems. In another example, the second sub-system 110 may be unaware of the first global application instance 118. If the first portable communications device 124 were to handover from the first sub-system 105 to the second sub-system 110 prior to the synchronization process completing, the first portable communications device 124 may not be able to communicate with the first global application instance 118, or it may receive incomplete or corrupt data from the second localized application instance 140. Accordingly, FIG. 5 is a flowchart of an exemplary method 500 for forming an incident area network. At block 502, the electronic processor determines that the sub-system synchronization is complete. The first domain name server 116, the first network address translator 122, and the first localized application instance 120 may transmit indications to the electronic processor, set a flag in a memory, or otherwise indicate that their portions of the process are complete. When the synchronization is not complete, the electronic processor continues to check for completion at block 502. When synchronization is complete, an incident area network 600 has been formed between the first sub-system 105 and the second sub-system 110. For example, FIG. 6 illustrates the incident area network 600, formed by the first sub-system 105 and the second sub-system 110. Returning to FIG. 5, in response to determining that the sub-system synchronization is complete, at block 504, the first portable communications device 124 is relocated (for example, by the first network core 112 and the second network core 132) from the first sub-system 105 to the second sub-system 110 (see FIG. 6). Relocating (for example a handoff or a handover) is performed using known techniques, including, for example, providing an identifier to the first portable communications device 124 and allocating bandwidth for communications between the first portable communications device 124 and the second sub-system 110.

The first local network address 130 and the second global network address 146 are referred to as "local" because they differ between sub-systems, and, in some instances, may not be accessible from outside of their respective sub-systems. However, in some embodiments, a local network address is accessible from outside its home sub-system. In such embodiments, user equipment may access localized application instances via virtual network addresses, local network addresses, or both. For example (with reference to FIG. 6), the first portable communications device 124 may access the first localized application instance 120 via the first local network address 130, and the second localized application instance 140 via either the first virtual network address 129 or the second local network address 148. Accordingly, in some embodiments, the first portable communications device 124 may relocate to the second sub-system 110 prior to full synchronization of the localized application instances, and continue to access the first localized application instance 120 using the first local network address 130. For example, some embodiments may include many types of localized application instances, and it may be desirable to for the incident area network 600 prior to full synchronization of every type of localized application instance. This may be done, for example, in the interest of time or for load-balancing purposes.

Figure 7:
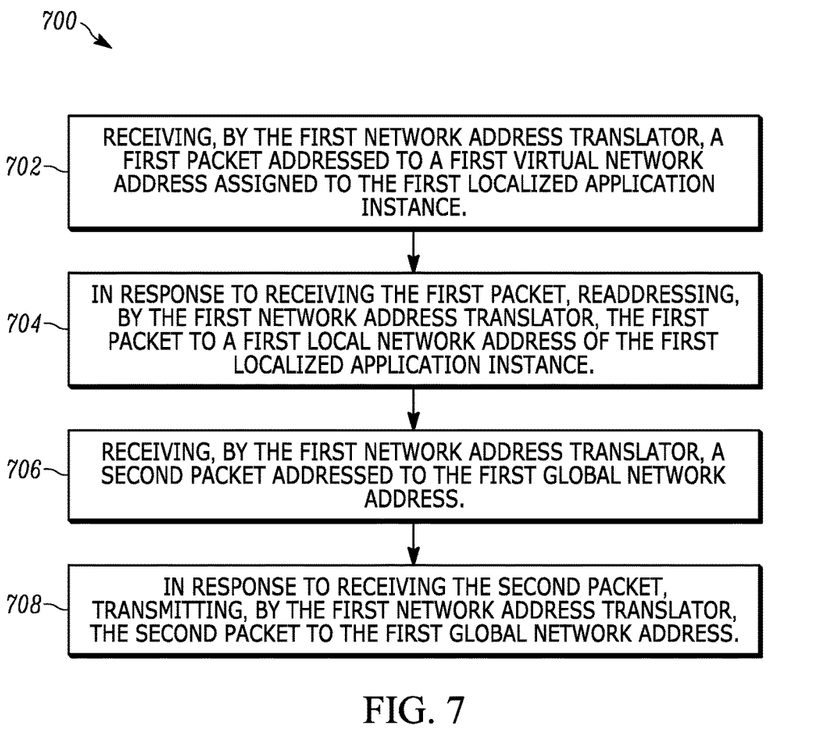
FIG. 7 is a flowchart of a method for operating an incident area network in accordance with some embodiments.
Figure 8:
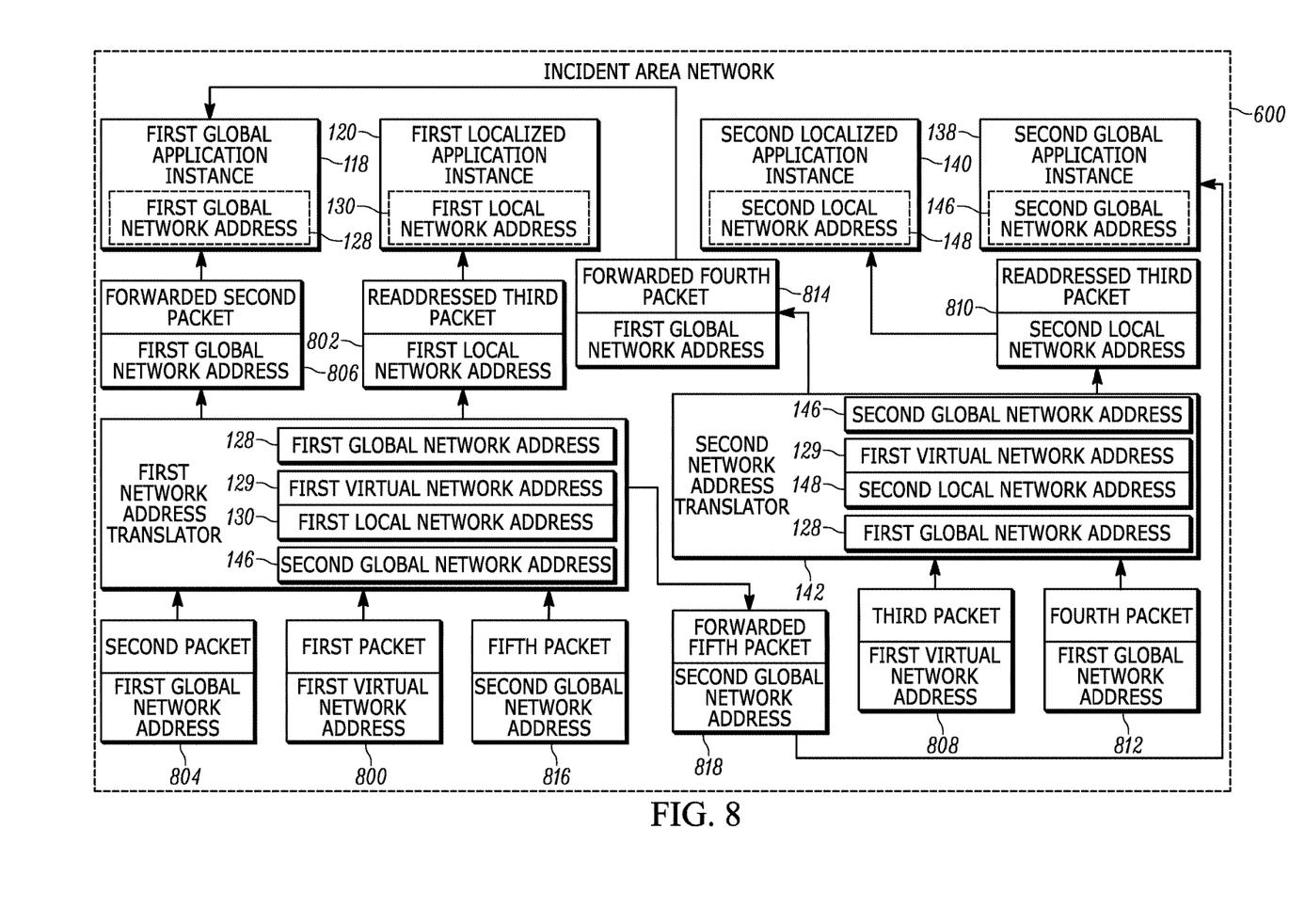
FIG. 8 is a block diagram of an incident area network in accordance with some embodiments.

FIG. 7 is a flowchart of an exemplary method 700 for operating the incident area network 600. As an example, the method 700 is explained in terms of the incident area network 600 operating to route network packets as illustrated in FIG. 8. For ease of description, not all components of the system 100 are illustrated in FIG. 8. In some embodiments, the network packets described with respect to FIG. 8 and the various methods described herein may originate from user equipment associated with either the first sub-system 105 or the second sub-system 110.

At block 702, the first network address translator 122 receives a first packet 800 addressed to the first virtual network address 129. At block 704, in response to receiving the first packet 800, the first network address translator 122 readdresses the first packet 800 to the first local network address 130, and transmits the readdressed first packet 802 to the first localized application instance 120. At block 706, the first network address translator 122 receives a second packet 804 addressed to the first global network address 128. At block 708, in response to receiving the second packet 804, the first network address translator 122 transmits the second packet 804 unchanged (as a forwarded second packet 806) to the first global network address 128 (that is, to the first global application instance 118).

Figure 9:
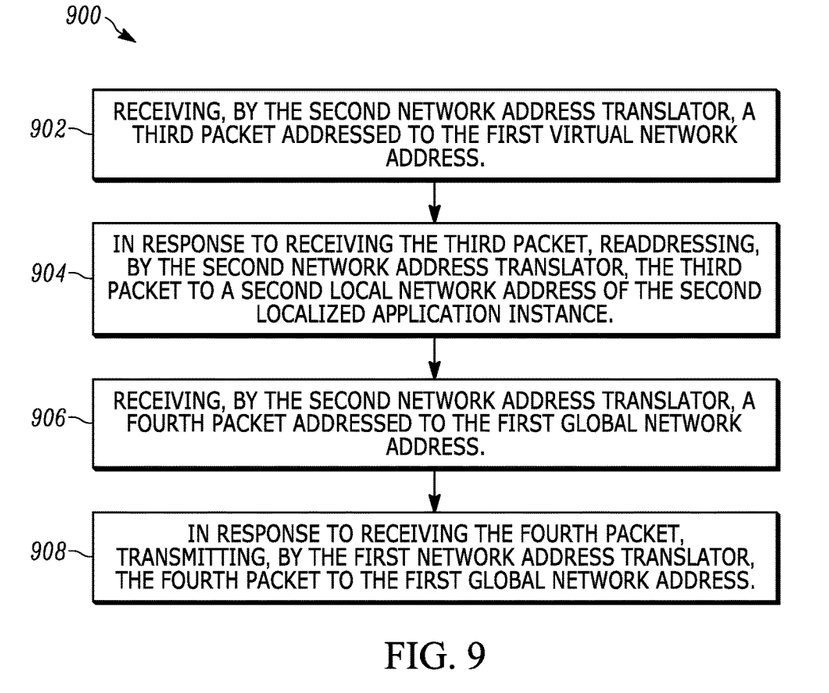
FIG. 9 is a flowchart of a method for operating an incident area network in accordance with some embodiments.

FIG. 9 is a flowchart of an exemplary method 900 for operating the incident area network 600. As an example, the method 900 is explained in terms of the incident area network 600 operating to route network packets as illustrated in FIG. 8. At block 902, the second network address translator 142 receives a third packet 808 addressed to the first virtual network address 129. At block 904, in response to receiving the third packet 808, the second network address translator 142 readdresses the third packet 808 to the second local network address 148, and transmits the readdressed third packet 810 to the second localized application instance 140. At block 906, the second network address translator 142 receives a fourth packet 812 addressed to the first global network address 128. At block 908, in response to receiving the fourth packet 812, the second network address translator 142 transmits the fourth packet 812 unchanged (as a forwarded fourth packet 814) to the first global network address 128 (that is, to the first global application instance 118).

Figure 10:
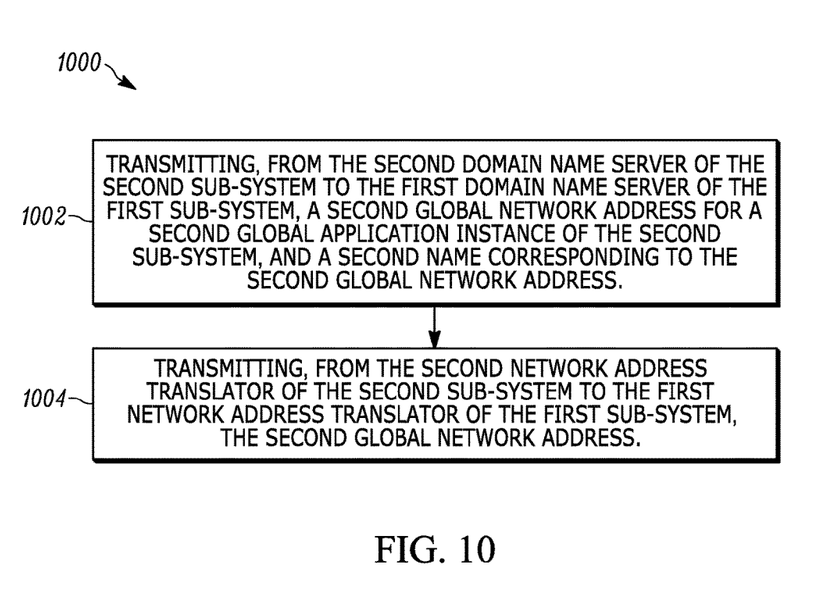
FIG. 10 is a flowchart of a method for operating an incident area network in accordance with some embodiments.

As illustrated in FIG. 8, some embodiments of the incident area network 600 include a second global application instance 138. Accordingly, embodiments of the synchronization process used to form the incident area network 600, as described above with respect to FIGS. 3 and 4, take into account the second global application instance 138. For example, FIG. 10 is a flowchart of an exemplary method 1000 for operating the incident area network 600. At block 1002, the second domain name server 136 transmits, to the first domain name server 116, the second global network address 146 and the second global name 144 corresponding to the second global network address 146. At block 1004, the second network address translator 142 transmits, to the first network address translator 122, the second global network address 146.

Figure 11:
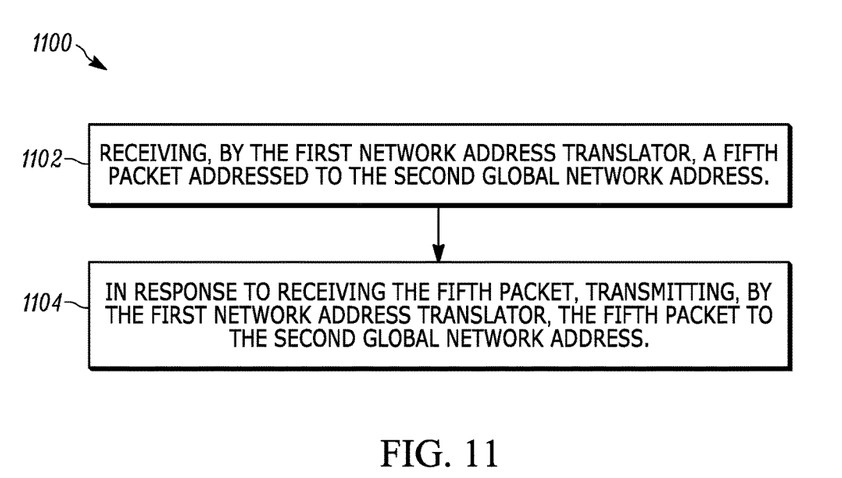
FIG. 11 is a flowchart of a method for operating an incident area network in accordance with some embodiments.

FIG. 11 is a flowchart of a method for operating an incident area network in accordance with some embodiments. FIG. 11 is a flowchart of an exemplary method 1100 for operating the incident area network 600. As an example, the method 1100 is explained in terms of the incident area network 600 operating to route network packets as illustrated in FIG. 8. At block 1102, the first network address translator 122 receives a fifth packet 816 addressed to the second global network address 146. At block 1104, in response to receiving the fifth packet 816, the first network address translator 122 transmits the fifth packet 816 unchanged (as the forwarded fifth packet 818) to the second global network address 146 (that is, to the second global application instance 138).

The methods illustrated in FIGS. 3, 5, 7, 9, 10, and 11 are described as being implemented on an electronic processor of the first sub-system 105 or the second sub-system 110. In some embodiments, the electronic processor includes electronic processors of multiple components in the respective sub-system (for example, one or more of the first network address translator 122, the first network core 112, and the first domain name server 116) or across sub-systems.

The embodiments presented herein have been described in terms of two or more sub-systems performing a synchronization process to form an incident area network. Incident area networks, once formed, may change, for example, through the addition or removal of one or more sub-systems to or from the incident area network. Each time a sub-system is added to or removed from an incident area network, the synchronization process will be performed to reflect the change in the incident area network. For example, in cases where a sub-system is removed from the incident area network, the synchronization process performed during disconnection includes updating the domain name server data and network address translator mappings to remove data that may have been added during the addition of the sub-system to the incident area network.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A system for forming an incident area network, the system comprising:
   a first sub-system in communication with a first portable communications device, the first sub-system including a network core including an electronic processor, a first domain name server, a first global application instance, a first localized application instance, and a first network address translator; and a second sub-system including a second domain name server, a second global application instance, a second localized application instance, and a second network address translator, wherein the electronic processor is configured to detect a network connection to the second sub-system and initiate a sub-system synchronization process;

the first domain name server is configured to, in response to the initiation of the sub-system synchronization process, transmit to the second domain name server a first global network address for the first global application instance, and a first name corresponding to the first global network address;

wherein the first network address translator is configured to transmit to the second network address translator the first global network address; and wherein the first localized application instance is configured to synchronize with the second localized application instance.

2. The system of claim 1, wherein the electronic processor is configured to determine that the sub-system synchronization is complete; and in response to determining that the sub-system synchronization is complete, relocate the first portable communications device from the first sub-system to the second sub-system.

3. The system of claim 1, wherein the first network address translator is configured to receive a first packet addressed to a first virtual network address assigned to the first localized application instance;

in response to receiving the first packet, readdress the first packet to a first local network address of the first localized application instance;

receive a second packet addressed to the first global network address; and in response to receiving the second packet, transmit the second packet to the first global network address.

4. The system of claim 2, wherein the second network address translator is configured to receive a third packet addressed to a first virtual network address mapped to the second localized application instance;

in response to receiving the third packet, readdress the third packet to a second local network address of the second localized application instance;

receive a fourth packet addressed to the first global network address; and in response to receiving the fourth packet, transmit the fourth packet to the first global network address.

5. The system of claim 1, wherein the second sub-system is configured to transmit, from the second domain name server of the second sub-system to the first domain name server of the first sub-system, a second global network address for the second global application instance of the second sub-system, and a second name corresponding to the second global network address; and transmit, from the second network address translator of the second sub-system to the first network address translator of the first sub-system, the second global network address.

6. The system of claim 5, wherein the first network address translator is configured to receive a fifth packet addressed to the second global network address; and in response to receiving the fifth packet, transmit the fifth packet to the second global network address.

7. The system of claim 1, wherein the network connection is an internet protocol layer connection.

8. The system of claim 1, wherein the first global network address is an internet protocol address.

9. The system of claim 1, wherein the first localized application instance of the first sub-system is configured to perform a database synchronization with the second localized application instance of the second sub-system.

10. The system of claim 1, wherein the first global application instance is configured to stream video content from the first global application instance to the first portable communications device via the second sub-system.

11. A method for forming an incident area network including a first sub-system and a second sub-system, the method comprising:

detecting, with an electronic processor of the first sub-system, a network connection to the second sub-system;

initiating a sub-system synchronization process including transmitting, from a first domain name server of the first sub-system to a second domain name server of the second sub-system, a first global network address for a first global application instance of the first sub-system, and a first name corresponding to the first global network address;

transmitting, from a first network address translator of the first sub-system to a second network address translator of the second sub-system, the first global network address; and synchronizing a first localized application instance of the first sub-system, with a second localized application instance of the second sub-system.

12. The method of claim 11, further comprising:

determining that the sub-system synchronization is complete; and in response to determining that the sub-system synchronization is complete, relocating a first portable communications device from the first sub-system to the second sub-system.

13. The method of claim 11, further comprising:

receiving, by the first network address translator, a first packet addressed to a first virtual network address assigned to the first localized application instance;

in response to receiving the first packet, readdressing, by the first network address translator, the first packet to a first local network address of the first localized application instance;

receiving, by the first network address translator, a second packet addressed to the first global network address; and in response to receiving the second packet, transmitting, by the first network address translator, the second packet to the first global network address.

14. The method of claim 11, further comprising:

receiving, by the second network address translator, a third packet addressed to a first virtual network address mapped to the second localized application instance;

in response to receiving the third packet, readdressing, by the second network address translator, the third packet to a second local network address of the second localized application instance;

receiving, by the second network address translator, a fourth packet addressed to the first global network address; and in response to receiving the fourth packet, transmitting, by the second network address translator, the fourth packet to the first global network address.

15. The method of claim 11, wherein the sub-system synchronization process further includes
transmitting, from the second domain name server of the second sub-system to the first domain name server of the first sub-system, a second global network address for a second global application instance of the second sub-system, and a second name corresponding to the second global network address; and
transmitting, from the second network address translator of the second sub-system to the first network address translator of the first sub-system, the second global network address.

16. The method of claim 15, further comprising:
receiving, by the first network address translator, a fifth packet addressed to the second global network address; and
in response to receiving the fifth packet, transmitting, by the first network address translator, the fifth packet to the second global network address.

17. The method of claim 11, wherein detecting the network connection includes detecting an internet protocol layer connection.

18. The method of claim 11, wherein transmitting the first global network address includes transmitting an internet protocol address.

19. The method of claim 11, wherein synchronizing the first localized application instance includes performing a database synchronization.

20. The method of claim 11, further comprising:
streaming video content from the first global application instance to a first portable communications device via the second sub-system.

* * * * *